Patented Apr. 22, 1952

2,593,669

UNITED STATES PATENT OFFICE 2,593,669

PRODUCTION OF PARAFORMALDEHYDE

Bertrand W. Greenwald, Pawhuska, and William B. Hughes, Barnsdall, Okla., assignors to Cities Service Oil Company, Bartlesville, Okla., a corporation of Delaware No Drawing. Application February 9, 1949, Serial No. 75,496

1 Claim. (Cl. 260—340)

This invention relates to improvements in the production of paraformaldehyde, and more particularly to the production of paraformaldehyde of controlled formaldehyde assay, solubility, and reactivity.

Paraformaldehyde is usually prepared by vacuum concentration of aqueous formaldehyde solutions in batch lots. The vacuum concentration of formaldehyde solutions will proceed evenly without undue losses of formaldehyde until a paraformaldehyde assaying from 92 to 94 per cent formaldehyde is reached. Concentration from this point to a 95 per cent or more assay is extremely time-consuming, and heavy losses of formaldehyde are incurred, especially when paraformaldehydes assaying from 96 to 97 per cent formaldehyde are to be produced. An additional drawback of present commercial processes is that the paraformaldehyde produced will always vary slightly in its characteristics from batch to batch, and an absolutely uniform and standardized product cannot be obtained.

It is an object of this invention to provide a process for upgrading a paraformaldehyde not meeting commercial specifications to a paraformaldehyde meeting such specifications as to formaldehyde assay, rate of solution, and reactivity.

It is a further object of this invention to provide a method of standardizing the commercial production of formaldehyde so that a uniform product may be obtained at all times.

Generally, our process consists in vacuum concentrating an aqueous solution of formaldehyde to recover a paraformaldehyde assaying from about 92 per cent to about 94 per cent formaldehyde, and blending the paraformaldehyde thus recovered with alpha polyoxymethylene in an amount such as to yield a blend having the desired percentage assay of formaldehyde. Alpha polyoxymethylene, a formaldehyde polymer assaying 98.5+ per cent formaldehyde, may be easily prepared by precipitation from an aqueous formaldehyde solution by caustic or sulfuric acid treatment. Due to its insolubility and low reactivity it has been heretofore considered chiefly as a laboratory curiosity, although recently some uses have been found in the rubber industry. Surprisingly, we have found that its characteristics are modified by blending with paraformaldehyde prepared by vacuum concentration, so that a blend having a formaldehyde assay of from 95 to 98 per cent exhibits the same characteristics as a paraformaldehyde of comparable assay prepared by present commercial processes. We are thus able to prepare paraformaldehydes meeting commercial specifications from paraformaldehydes assaying from 92 to 94 per cent formaldehyde, avoiding the large formaldehyde losses usually incurred in concentration to higher assays, and appreciably shortening the time cycle of the process.

Users of paraformaldehyde set various specifications as to formaldehyde content, rate of solubility, and reactivity, depending upon the use to which the paraformaldehyde is to be put, these specifications varying from user to user. A typical rate of solubility test is to make up a water solution buffered to a pH of 8.0 with one molar mono-potassium di-acid phosphate and caustic soda. Five grams of paraformaldehyde are then added for each 100 cc. of solution, and the mixture is held at 25° C.±0.1° for thirty minutes, after which the mixture is rapidly filtered and the percentage of formaldehyde dissolved during the period is determined. Reactivity tests generally comprise adding paraformaldehyde to a material supplied by the user, and noting the time required for the mixture to gel under specified temperature conditions. Commercial specifications for formaldehyde assay generally run from 95 per cent upwards, depending upon the use to which the paraformaldehyde is to be put.

Paraformaldehyde produced by our process will compare in all respects as to rates of solubility and reactivity with paraformaldehydes of similar formaldehyde assay produced by present processes. Comparable data as to rate of solubility and reactivity for commercial paraformaldehydes and paraformaldehydes produced by our new process is given in the following table. The alpha polyoxymethylene used in blending our paraformaldehydes contain 99 per cent formaldehyde. Blanks appearing in the table indicate that no tests were run. The reactivity tests A and B were run on materials supplied by two large users of paraformaldehyde according to methods prescribed by them. The commercial paraformaldehydes used in the tests were purchased on the open market from commercial paraformaldehyde producers.

| Material | Assay Weight Per cent HCHO | Solubility Per cent | Reactivity Test A (Sec.) | Reactivity Test B (min.) |
|---|---|---|---|---|
| POM+93.5% para | 95.4 | 50 | 265 | |
| Commercial para | 95.5 | 52 | 270 | 132 |
| POM+93.5% para | 95.8 | 44 | 274 | 144 |
| Commercial para | 95.9 | 44 | 286 | 156 |
| POM+93.5% para | 96.1 | 43 | | 154 |
| Commercial para | 96.8 | 35 | 315 | 170 |
| POM+93.0% para | 97.0 | 30 | 354 | 175 |
| Commercial para | 97.3 | 29 | 380 | 184 |

We have thus invented a process which produces paraformaldehyde meeting all commercial specifications from a low formaldehyde assay paraformaldehyde. Our process greatly shortens the time necessary for the production of paraformaldehyde, and avoids the large formaldehyde losses customarily encountered in recovering a paraformaldehyde assaying over 95 per cent formaldehyde by straight vacuum distillation.

Having now described our invention, what we claim as new and useful is:

The process of producing a product having essentially the same reactivity and solubility characteristics as commercial paraformaldehyde including concentrating an aqueous solution of formaldehyde under vacuum conditions to a paraformaldehyde having a formaldehyde assay of from 92 to 94 per cent, and blending the paraformaldehyde thus produced with alpha polyoxymethylene in such proportions that the blend will assay more than 95 per cent formaldehyde by weight.

BERTRAND W. GREENWALD.
WILLIAM B. HUGHES.

REFERENCES CITED

The following references are of record in the file of this patent:

UNITED STATES PATENTS

| Number | Name | Date |
|---|---|---|
| 2,153,526 | Walker | Apr. 4, 1939 |
| 2,369,504 | Walker | Feb. 13, 1945 |
| 2,481,981 | Craven | Sept. 13, 1949 |
| 2,498,206 | Greenwald | Feb. 21, 1950 |
| 2,519,550 | Craven | Aug. 22, 1950 |

OTHER REFERENCES

Walker: "Formaldehyde," p. 79, Reinhold Pub. Co., N. Y., 1944.